United States Patent
Sekino

(10) Patent No.: US 7,643,741 B2
(45) Date of Patent: Jan. 5, 2010

(54) IMAGE STABILIZATION UNIT, IMAGE STABILIZATION DEVICE, AND IMAGING APPARATUS

(75) Inventor: Shizuo Sekino, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 155 days.

(21) Appl. No.: 11/972,525

(22) Filed: Jan. 10, 2008

(65) Prior Publication Data

US 2008/0198462 A1 Aug. 21, 2008

(30) Foreign Application Priority Data

Feb. 15, 2007 (JP) ............................ P2007-035341

(51) Int. Cl.
*G03B 17/00* (2006.01)
*G03B 3/10* (2006.01)
*H04N 5/228* (2006.01)
*G02B 27/64* (2006.01)

(52) U.S. Cl. .................... 396/55; 396/133; 348/208.99; 348/208.2; 348/208.11; 359/554

(58) Field of Classification Search .................... 396/55
See application file for complete search history.

(56) References Cited

U.S. PATENT DOCUMENTS

| 5,155,520 A | * | 10/1992 | Nagasaki et al. | ............... 396/53 |
| 2005/0225646 A1 | | 10/2005 | Shintani | ................ 348/208.99 |
| 2008/0074504 A1 | * | 3/2008 | Sekino | ................... 348/208.99 |
| 2008/0085108 A1 | * | 4/2008 | Sekino et al. | ................. 396/55 |

FOREIGN PATENT DOCUMENTS

| JP | 7-274056 A | 10/1995 |
| JP | 2612371 A | 2/1997 |
| JP | 2005-326807 A | 11/2005 |
| JP | 2006-295553 A | 10/2006 |

* cited by examiner

*Primary Examiner*—Melissa J Koval
(74) *Attorney, Agent, or Firm*—Birch, Stewart, Kolasch & Birch, LLP

(57) ABSTRACT

By regulating movement of first and second arms 231A and 241A only in an optical axis direction using guide members EN1 and EN2, magnetic forces received from a first magnet 243A and a second magnet 233A which expand horizontally with respect to the optical axis can be stably detected by using a first sensor 2341A held in a first arm and a second sensor 2441A held by a second arm.

7 Claims, 10 Drawing Sheets

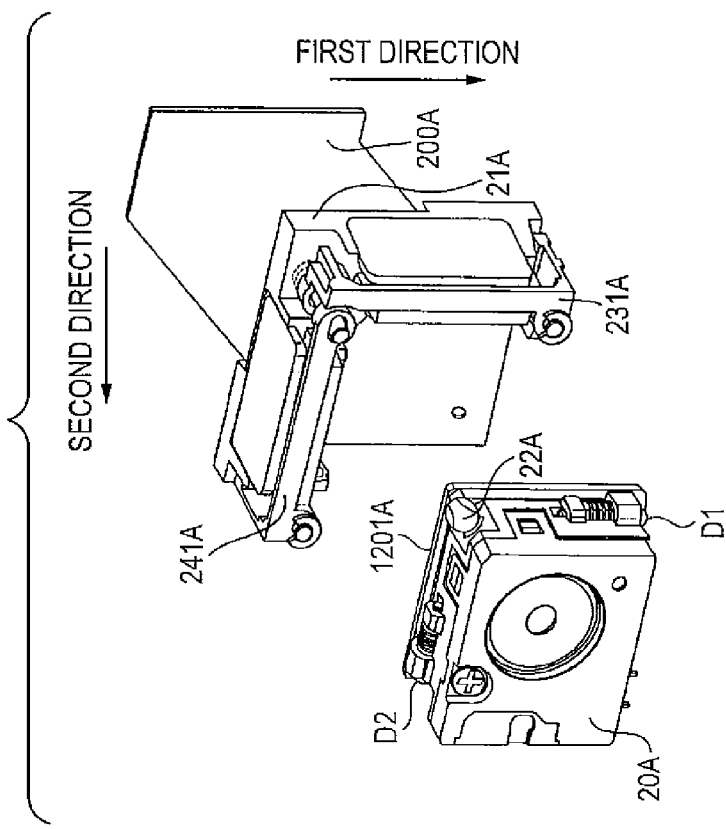
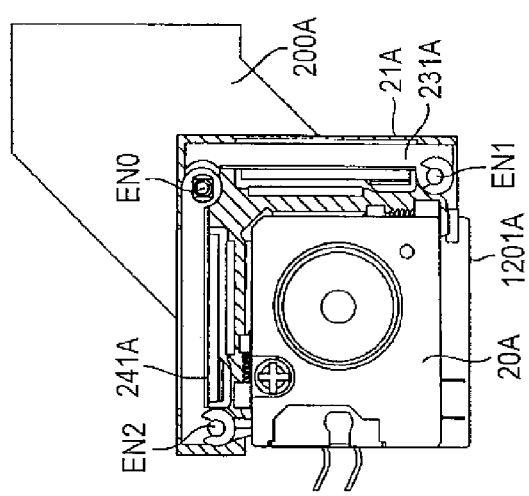
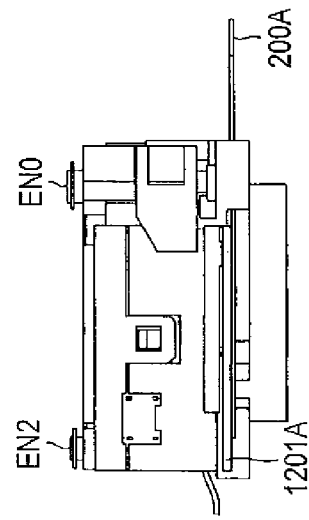

PITCHING

YAWING

PITCHING+ YAWING

IMAGE STABILIZATION UNIT, IMAGE STABILIZATION DEVICE, AND IMAGING APPARATUS

CROSS-REFERENCE TO RELATED APPLICATIONS

This application is based upon and claims the benefit of priority from the Japanese Patent Application No. 2007-35341 filed on Feb. 15, 2007; the entire contents of which are incorporated herein by reference.

BACKGROUND OF THE INVENTION

1. Technical Field

The invention relates to: an image stabilization unit that is suitably used, as an image stabilization mechanism, in an imaging device such as a digital camera and a camera built-in cellular phone; an image stabilization device having the image stabilization unit; and an imaging apparatus having the image stabilization device.

2. Description of the Related Art

Conventionally, in order to suppress disturbance in a captured image due to vibration of a user's hand or the like, various image stabilization mechanisms have been used in digital cameras and the like (see JP Hei. 7-274056 A, JP 2005-326807 A (corresponding to US 2005/0225646 A) and Japanese Patent No. 2612371).

Some of the image stabilization mechanisms adopt a system called a gimbal mechanism so that a hold module is freely rotatable in a yaw direction and in a pitch direction.

However, in a gimbal mechanism disclosed in JP Hei. 7-274056 A, it is necessary to provide rotary joints or the like that rotate freely in four positions, that is, upper, lower, left, and right positions in the hold module. Accordingly, the size of the image stabilization mechanism tends to increase. In addition, excessive miniaturization of the image stabilization mechanism causes such a problem that bearing portions of the rotary joints or the like are weakened.

Thus, unpublished earlier Japanese patent application Nos. 2006-269712, 2006-269713, 2006-269714 and 2006-269715, filed by Fujinon Corporation, propose a drive structure that supports a pivot point that is one point on an outer circumference of a hold module drives a hold module so as to freely swing and that drives the hold module through first and second drive points that are respectively separate from the pivot point in first and second directions that are different from each other. When this drive structure is implemented, it becomes possible to downsize the image stabilization unit. As a result, it also becomes possible to build the image stabilization unit in a mobile device.

FIG. 11 is a diagram showing an image stabilization unit 2 of another example that is designed to be downsized in order to build it in a mobile device.

FIG. 11 shows a diagram of the image stabilization unit 2 of the other example, when it is viewed from an upward right direction. FIG. 11 shows a hold module 20 that holds an imaging lens 10 and a support body 21 that supports the hold module 20 at a pivot point PB so as to freely swing, which are components of the image stabilization unit 2.

As shown in FIG. 11, in order to allows the hold module 20 to freely rotate in the yaw direction of the hold module 20, the support body 21 is provided with a first drive section 23 along a right side surface of the hold module 20. Also, in order to allow the hold module 20 to freely rotate in the pitch direction, the support body 21 is provided with a second drive section 24 along a bottom surface of the hold module 20.

The first drive section 23 and the second drive section 24 are respectively provided with coils 234 and 244 and magnets 233 and 243. The magnets 233 and 243 are respectively fixed to support members 210 and 211 extending from the support body 21 along the right side surface of the hold module 20 and the bottom surface of the hold module 20.

On the other hand, the coils 234 and 244 are connected to arms ARM1 and ARM2 that are held to be freely movable with respect to the support body 21. Front end portions of the arms ARM1 and ARM2 are engaged with the hold module 20 at drive points D1 and D2.

These engagements are implemented by pressing sphere-shaped engagement members Q1 and Q2 disposed in the drive points D1 and D2 on the arm ARM1 and ARM2 sides against concave portions provided in the drive points D1 and D2 on the hold module 20 side using springs SP1 and SP2.

With the configuration shown in FIG. 11, for example, when the image stabilization unit is installed in an image stabilization device and when current signals sent from a control section of the image stabilization unit current causes current to flow through the coils 234 and 244, electromagnetic forces act between the coils 234 and 244 and the magnets 233 and 243, to move the coils 234 and 244. Thereby, the arms ARM1 and ARM2 are moved together with the coils 234 and 244, and the hold module 20 is individually driven at the two drive points D1 and D2. As a result, the hold module 20 swings as a whole. The two coils 234 and 244 shown in FIG. 11 are coil substrates that are substrates formed with coils thereon. The respective coil substrates are disposed to be parallel to the magnets 243 and 233. Also, the image stabilization unit shown in FIG. 11 is not one that is used for open loop control as described in JP 2006-295553 A, but one used for feedback control. Therefore, sensors, for example, hall elements HD1 and HD2 are disposed on the coil substrates so that positions of the coil substrates when the coil substrates are moved can be detected. These sensors HD1 and HD2 detect changes in magnetic forces applied from the magnets 233 and 243 when the hold module 20 is driven at the driving points D1 and D2 in accordance with movements of the coil substrates together with the arms and outputs magnitudes of the detected magnetic forces as position signals.

However, in the above-described configuration of the image stabilization unit, the front end portions of the arms ARM1 and ARM2, which are engaged with the hold module 20, are free ends. Therefore, when the hold module 20 is simultaneously driven at the two drive points (the first drive point D1 and the second drive point D2), there may be a case where movement of the arm ARM2 or ARM1 driven by one of the drive points D2 and D1 follows movement of the arm ARM1 or ARM2 driven by the other of the drive points D1 and D2. If such a case occurs, a distance between the magnet and the sensor, which is disposed on the coil substrate held by the one of the arms changes depending on the movement of the other arm. As a result, there may be a case where an output of the sensor HD1 or HD2 disposed on the coil substrate held by the arm becomes unstable.

If the outputs of these sensors HD1 and HD2 become unstable, when the image stabilization unit is installed in the image stabilization device, the position of the coil substrate is not correctly detected by the control section of the image stabilization device. As a result, posture control of the hold module is not performed accurately.

SUMMARY OF THE INVENTION

In view of the above circumstances, the invention provides an image stabilization unit in which an output signal from a position detection sensor is stabilized, an image stabilization device having the image stabilization unit, and an imaging apparatus having the image stabilization device.

According to an aspect of the invention, an image stabilization unit includes a hold module, a support member, a first drive mechanism, a second drive mechanism, a first sensor and a second sensor. The hold module holds a lens. The support member includes a support portion that supports the hold module so as to freely swing in any direction at a pivot point that is one point on an outer circumference of the hold module. The first drive mechanism drives a first drive point located on the outer circumference of the hold module in an optical axis direction. The first drive point is apart from the pivot point in a first direction that is different from the optical axis direction. The second drive mechanism drives a second drive point located on the outer circumference of the hold module in the optical axis direction. The second drive point is apart from the pivot point in a second direction that is different from the optical axis direction and the first direction. The first drive mechanism includes a first arm, a first coil, a first magnet and a first guide member. The first arm supports the first drive point so as to be freely rotatable. The first coil is held by the first arm. The first coil generates a first drive force in the optical axis direction upon reception of an action of a first magnetic force and a first current flow, to cause the first arm to drive the first drive point in the optical axis direction. The first magnet is held by the support member. The first magnet applies the first magnetic force to the first coil and expands horizontally with respect to the optical axis. The first guide member is fixed to the support member. The first guide member guides the first arm so that a first action point of the first arm that supplies the first drive force to the first drive point is moved in the optical axis direction. The second drive mechanism includes a second arm, a second coil, a second magnet and a second guide member. The second arm supports the second drive point so as to be freely rotatable. The second coil is held by the second arm. The second coil generates a second drive force in the optical axis direction upon reception of an action of a second magnetic force and a second current flow, to cause the second arm to drive the second drive point in the optical axis direction. The second magnet is held by the support member. The second magnet applies the second magnetic force to the second coil and expands horizontally with respect to the optical axis. The second guide member is fixed to the support member. The second guide member guides the second arm so that a second action point of the second arm that supplies the second drive force to the second drive point is moved in the optical axis direction. The first arm supports the first sensor. The first sensor detects change in the first magnetic force applied by the first magnet. The change is caused by movement of the first arm in the optical axis direction when the first arm drives the first drive point. The second arm supports the second sensor. The second sensor detects change in the second magnetic force applied by the second magnet. The change is caused by movement of the second arm in the optical axis direction when the second arm drives the second drive point.

With the image stabilization unit, upon reception of the first and second magnetic forces and the first and second current flows, the first and second coils respectively cause the first and second arms to drive the hold module in the optical axis direction, to thereby swing the hold module.

Then, both the arms are guided by the first and second guide members and moved in parallel in the optical axis direction. Therefore, movement of one of the arms does not follow that of the other arm unlike heretofore.

When the first and second arms are moved in parallel in the optical axis direction, a distance between the first arm and the first magnet expanding horizontally with respect to the optical axis direction is maintained to be constant. Similarly, a distance between the second arm and the second magnet is maintained to be constant.

As a result, (i) the output of the first sensor, which is supported by the first arm and which detects the change, caused by the movement of the first arm in the optical axis direction when the first arm drives the first drive point, in the first magnetic force applied by the first magnet, and (ii) the output of the second sensor, which is supported by a second arm and which detects the change, caused by the movement of the second arm in the optical axis direction when the second arm drives the second drive point, in the second magnetic force applied by the second magnet, become stable.

As described above, achieved is the image stabilization unit in which the output signals transmitted from the position detecting sensors are stabilized.

The hold module may hold the lens and an image sensor that captures light from a subject to generate an image signal.

If the hold module only holds the lens, it becomes necessary to provide a structure for holding an image sensor in the rear end portion separately. However, if the hold module holds the image sensor together with the lens, the configuration is simplified and downsized and it is possible to build the image stabilization unit in a small mobile device.

Also, the first and second drive points may be formed in such positions that a line segment connecting the first drive point and the pivot point and a line segment connecting the second drive point and the pivot point intersect with each other at about 90 degrees.

Then, the hold module is driven with the first and second axes being handled as independent drive axes. Thereby, it is possible to make the hold module to take various postures. Accordingly, when the image stabilization device is configured to have the image stabilization unit and a hand vibration detection sensor, it is possible to control the posture of the hold module so as to cancel hand vibration detected by the hand vibration detection sensor in accordance with the hand vibration detected by a hand vibration detection sensor.

The hold module may includes a sphere-shaped convex portion in the pivot point, and the support member may include, in the support portion, a sphere-shaped concave surface that receives the convex portion.

Also, the hold module may include sphere-shaped convex portions in the first and second drive points, respectively. The first and second arms may respectively include, in the first and second action points, sphere-shaped concave portions that receive the sphere-shaped convex portions in the first and second drive points. The first and second arms may supply the first and second drive forces to the convex portions through the concave portions, respectively.

Thereby, since a bearing structure for portions of the drive points required to swing the hold module can be simplified and downsized, a great advantage in attempting the downsize of the whole image stabilization unit can be achieved.

Furthermore, the image stabilization unit may further include a vibration detection section and a vibration control section. The vibration detection section detects vibration. The vibration control section controls the first and second drive mechanisms to rotate the hold module based on a detection result by the vibration detection section.

According to another aspect of the invention, an imaging apparatus includes the image stabilization device set forth above. The imaging apparatus captures a subject image to generate image data in which blur is reduced by an operation of the image stabilization device.

With the above image stabilization device, the image stabilization unit in which the output signals of the position detection sensors are stabilized, the image stabilization device having the image stabilization unit, and the imaging apparatus having the image stabilization device are provided.

BRIEF DESCRIPTION OF THE DRAWINGS

FIGS. 7A, 7B and 7C are diagrams for explaining a method of drawing out a flexible substrate 200A from a hold module 20A.

DETAILED DESCRIPTION OF EMBODIMENT(S) OF THE INVENTION

Hereinafter, an image stabilization unit according to embodiments of the invention and an image stabilization device having the image stabilization unit will be described in detail with reference to FIGS. 1 to 9. Since the embodiments described below are detailed examples of the image stabilization unit and the image stabilization device having the image stabilization unit, various limitations which are technically preferred are applied to the embodiments. However, the scope of the invention is not limited to those embodiments unless otherwise mentioned for limiting the scope of the invention in the descriptions below.

Figure 1:
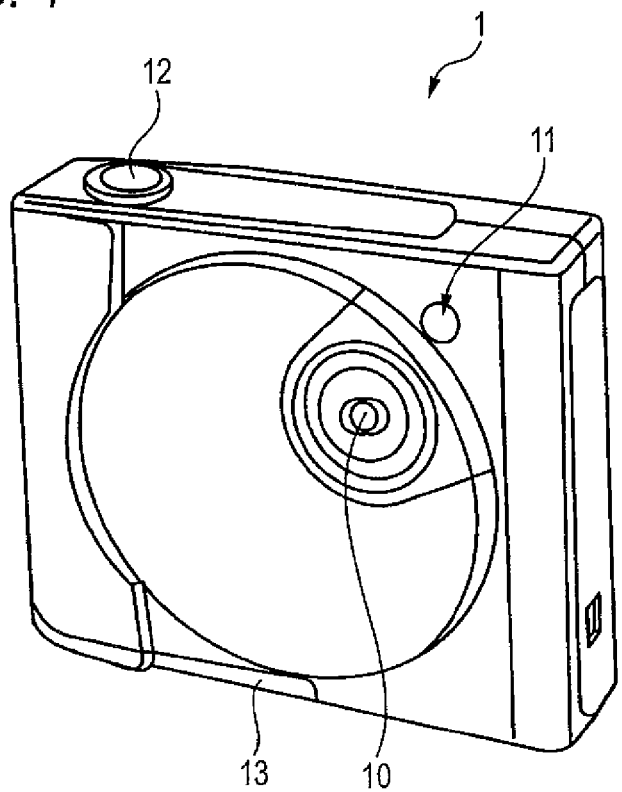
FIG. 1 is a perspective view showing an appearance of a digital camera using an image stabilization unit according to an embodiment of the invention, when it is viewed from an obliquely upward direction.

FIG. 1 is a perspective appearance view showing an image stabilization unit and a digital camera of using an image stabilization device of one embodiment that includes the image stabilization unit when they are viewed from an obliquely upward direction.

The digital camera 1 shown in FIG. 1 is a small-sized automatic focusing camera in which an image stabilization unit and an example of an image stabilization device having the image stabilization unit are built. On the front side of the digital camera 1 shown in FIG. 1, an imaging lens 10 and a finder window 11 are disposed. Also, on the upper surface of the digital camera 1, a release switch 12 is disposed. FIG. 1 shows a cover 13 disposed on the bottom surface of the camera, for inserting or taking out a battery, a recording medium, or the like.

Figure 2:
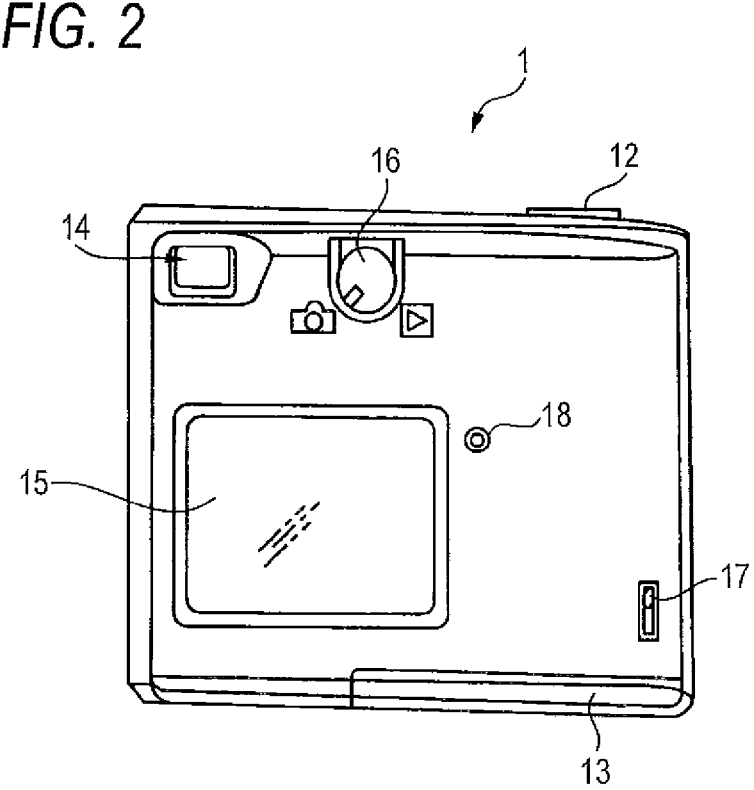
FIG. 2 is a rear view of the digital camera shown in FIG. 1.

FIG. 2 is a rear view of the digital camera shown in FIG. 1.

On the rear side of the digital camera 1 shown in FIG. 2, a finder 14, a liquid crystal display screen 15, a mode switching knob 16 that is operated for switching a mode of the digital camera 1, and a power switch 17 are disposed. This digital camera 1 has a photograph mode that is a mode used for photographing a subject and a reproduction mode that is a mode used for displaying an image recorded in a non-volatile RAM 305 (see FIG. 3) on the liquid crystal display screen 15.

FIG. 2 also shows an "OK/CANCEL" button 18 that is operated for determining as to whether or not a photographed image, which is displayed on the liquid crystal display screen 15 just after a photograph operation is performed, is recorded in the RAM 305.

Figure 3:
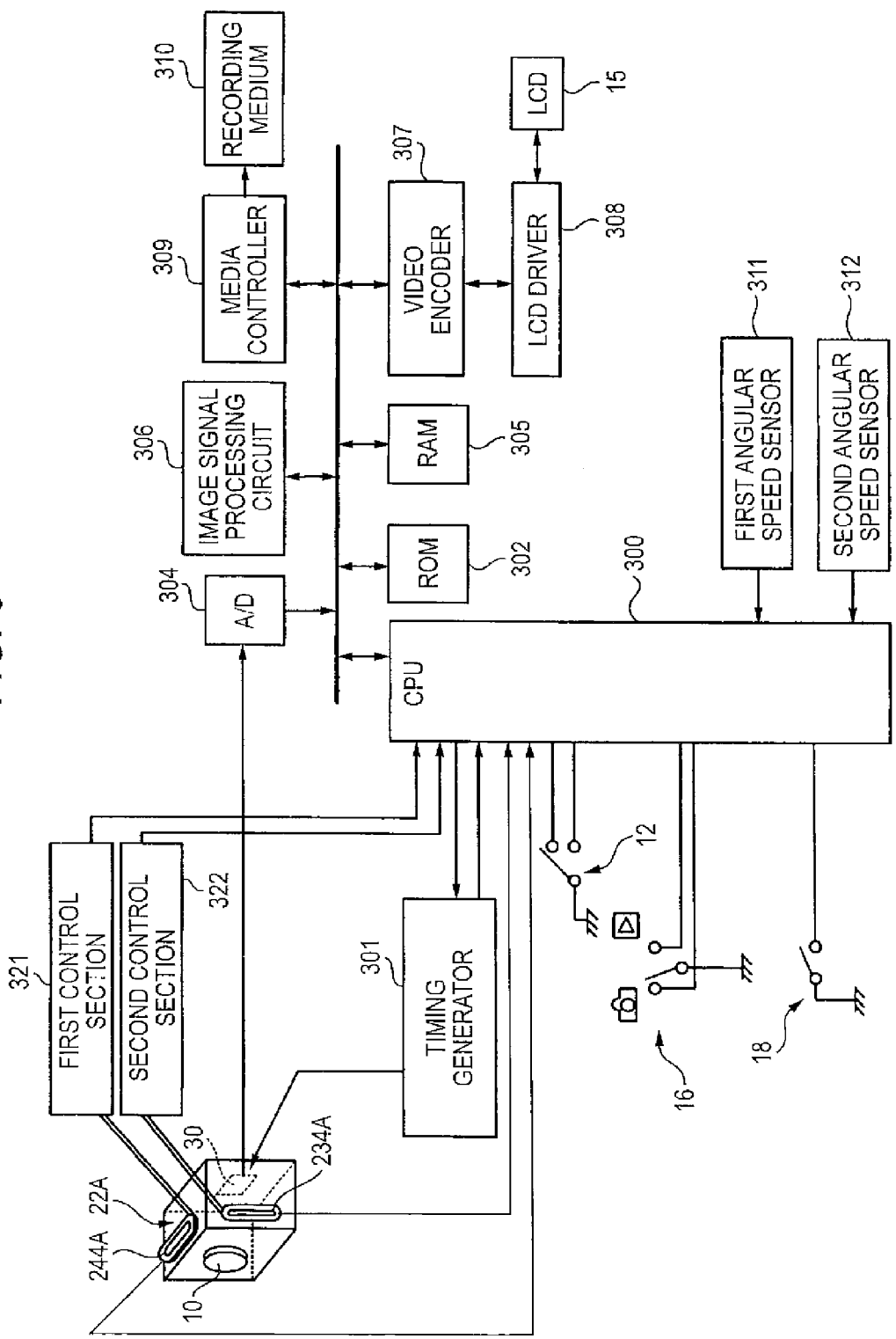
FIG. 3 is a functional block diagram of the digital camera shown in FIGS. 1 and 2.

FIG. 3 is a functional block diagram of the digital camera in which the image stabilization device is built.

FIG. 3 shows an A/D 303, a CPU 300, a ROM 302, a RAM 305, an image signal processing circuit 306, a video encoder 307, and a media controller 309. These components are connected together through a bus. The CPU 300 and an imaging element 30 are connected together through a timing generator 301. A first angular velocity sensor 311 and a second angular velocity sensor 312 which correspond to input devices are connected to the CPU 300. A first control section 321 and a second control section 322 which correspond to output devices are connected to the CPU 300. The first control section 321 and the second control section 322 cause currents to flow through coils 234A and 244A provided in an image stabilization unit 2A in accordance with detection signals sent from the first angular velocity sensor 311 and the second angular velocity sensor 312. The first and second control sections 321 and 322 constitute the image stabilization device together with the first and second angular velocity sensors 311 and 312. Furthermore, to the CPU 300, a group of switches such as the release switch 12 and the mode switch 16 are connected.

The CPU 110 has a function of executing various programs and controls the overall operations of this digital camera based on switch operations or input signals from the sensors. The ROM 111 stores the various programs to be executed by the CPU 110 and various parameters required for execution of the various programs. The CPU 110 executes the program stored in the ROM 111 while using the RAM 305 as a working area.

The timing generator 301 supplies a timing signal for setting an electronic shutter of the imaging element 30, for outputting an image signal generated by the imaging element 30, or the like.

The A/D circuit 304 receives the image signal generated by the imaging element 30, converts the image signal into a digital signal, and transmits the digital image signal to the bus. The image signal processing circuit 306 performs an image signal process for the image signal transmitted through the bus.

The video encoder 307 causes an LCD driver 308 to display an image on the LCD screen 15. The media controller 309 is used for reading out data from a loaded recording medium 310 or writing the image data or the like transmitted through the bus into a recording medium 310.

When the release switch 12 of the digital camera 1 having the above-described configuration is operated, a photograph process is performed inside the digital camera and image data is generated and recorded in the recording medium 310.

Here, the image stabilization device included in the digital camera 1 will be described in detail.

As shown in FIG. 3, the digital camera 1 is provided with the first angular velocity sensor 311 for detecting an angular velocity in the so-called pitch direction and the second angular velocity sensor 312 for detecting an angular velocity in the so-called yaw direction perpendicular to the pitch direction. The first and second angular velocity sensors 311 and 312 are configured to output signals based on the angular velocities detected by the respective sensors.

In this digital camera 1, the CPU 300 determines amounts of vibration in the pitching and yaw directions based on the signals output from the first and second angular velocity sensors 311 and 312 within a predetermined time period from a time when the release switch 12 is fully pushed down. Since a method for determining the amount of vibration based on an angular velocity sensor is a technology known to public, description thereon will be omitted here.

The CPU 300 transmits signals, based on the detected amounts of vibration, to the first and second control sections 321 and 322 shown in FIG. 3.

An image stabilization operation based on the signals according to the amounts of vibration is performed by causing an optical axis of the imaging lens 10 held by changing a hold module 20A inside an image stabilization unit (which will be described later), that is, a direction of the hold module 20A to a direction for canceling the detected vibration. When this hold module 20A is to be directed toward the direction for canceling the detected vibration, the CPU 300 precisely controls a posture of the hold module 20A while monitoring the signals output from the sensors provided in the image stabilization unit that holds the hold module 20A.

Figure 4:
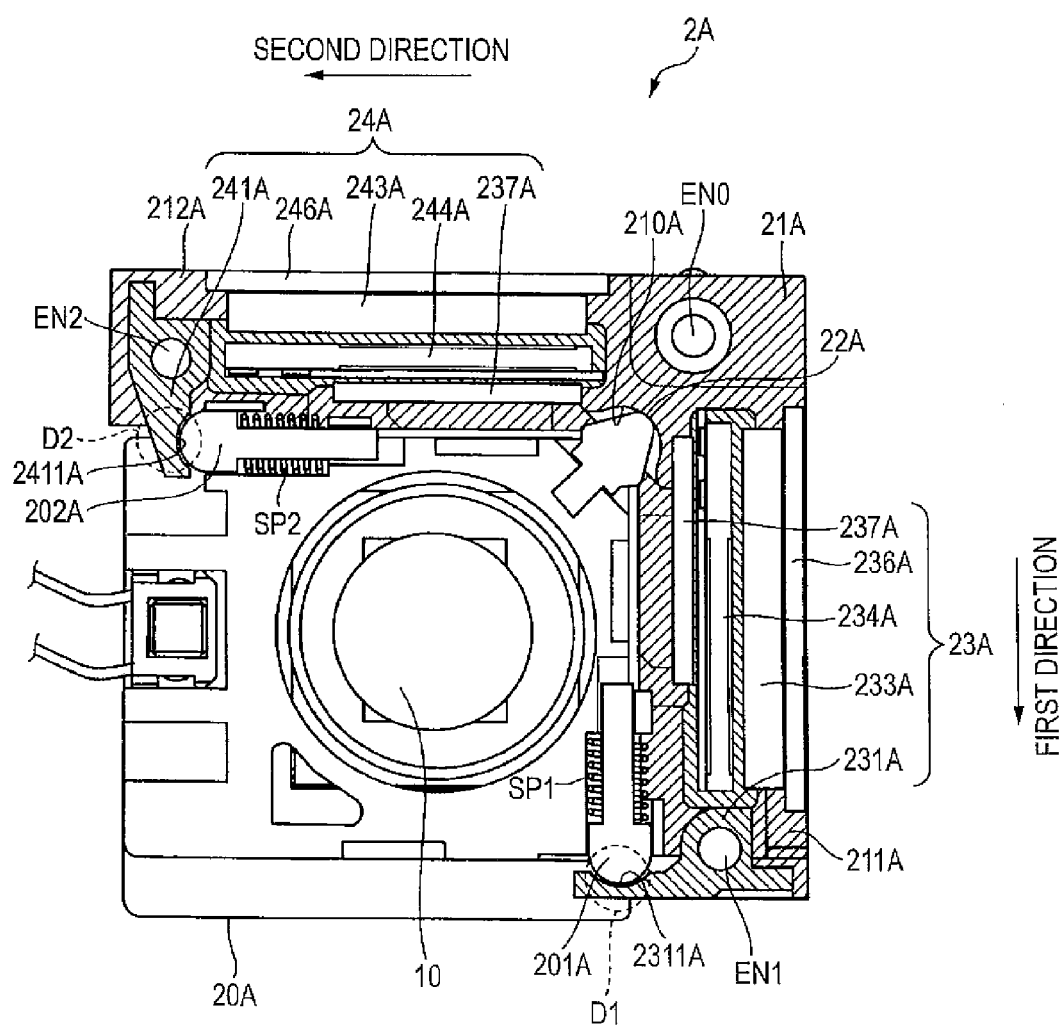
FIG. 4 is a diagram showing an image stabilization unit according to the embodiment of the invention.

The first and second control sections 321 and 322 control the direction of the hold module 20 by controlling directions and magnitudes of the currents flowing through the first coil 234A shown on the right side in FIG. 4 and the second coil 244A that is the same type as the first coil 234A.

Here, the configuration of an image stabilization unit 2A according to this embodiment of the invention will now be described.

FIG. 4 is a diagram showing the image stabilization unit 2A provided in the digital camera 1 shown in FIGS. 1 and 2, according to this embodiment of the invention.

FIG. 4 is a diagram showing a front view of the image stabilization unit 2A according to this embodiment. FIG. 4 shows, as components of the image stabilization unit 2A, a first drive mechanism 23A that is disposed on the right side of the hold module 20A for enabling the hold module 20A to freely rotate in the yaw direction; a second drive mechanism 24A that is disposed on the upper side of the hold module 20A for enabling the hold module 20A to freely rotate in the pitch direction; an pivot point 22A that supports the hold module 20A so as to freely swing in the pitching and yaw directions with respect to a support member 21A; a first drive point D1 that is disposed in a part of the hold module 20A and that engages, through a sphere-shaped convex portion 201A, with a concave portion 2311A of a first arm 231A provided in the first drive mechanism 23A; a second drive point D2 that similarly engages, through a sphere-shaped convex portion 202A, with a concave portion 2411A of a second arm 241A provided in the second drive mechanism 24A. Also, as described above, the hold module 20A according to this embodiment holds the image sensor that captures light from the subject to generate an image signal while holding the lens 10.

The structure of the image stabilization unit 2A will now be briefly described with reference to FIG. 4.

First, the support member 21A having a support portion 210A for supporting the hold module 20A shown in FIG. 4 at the pivot point 22A, which is one point on the outer circumference of the hold module 20A, so that the hold module 20A is freely swingable in any direction is provided. The support portion 210A of the support member 21A is formed with a sphere-shaped concave surface. The concave surface of the support portion 210A is engaged with a convex portion formed in the pivot point 22A of the hold module 20A.

Also, the support member 21A extends in first and second directions with the support portion 22A located in its center, and has first and second wing portions 211A and 212A that hold the first and second drive mechanisms 23A and 24A. In this example, as can be seen in FIG. 4, the first and second drive points D1 and D2 are formed in such positions that (i) a second axis connecting the first drive point D1 and the pivot point 22A together and defining a first direction and (ii) a first axis connecting the second drive point D2 and the pivot point 22A together and defining a second direction intersect each other at about 90 degrees. It is noted that, portions in which the convex portions 201A, 202A and the concave portions 2311A, 2411A are in contact should be formed so as to support swing of the support module 20A when the hold module 20A is driven through the drive points D1 and D2. Therefore, such a structure is adopted that compression springs SP1, SP2 elastically press the convex portions 201A, 202A against the concave portions 2311A, 2411A.

The configurations of the two drive mechanisms 23A and 24A will now be described with reference to FIG. 4.

The two drive mechanisms 23A and 24A includes: magnets 233A and 243A that generate magnetic field and are supported by the support member 21A; and the coils 234A and 244A, which are disposed inside the magnetic fields and generate force to rotate the hold module 20A when currents flow therethrough. The support member 21A fixedly supports the magnets 233A and 243A which constitute the first and second drive mechanisms 23A and 24A. The coils 234A and 244A constituting the first and second drive mechanisms 23A and 24A are supported by the support member 21A so as to be freely movable in the optical axis direction (perpendicular to the paper of the figure) of the lens 10A. Thereby, when currents flow through the coils 224A and 234A, the coils 224A and 234A generate forces in the optical axis direction. The coils 234A and 244A are attached to the two arms 231A and 241A provided in the first and second wing portions 211A and 212A which constitute the support member 21A as described above. The magnets 233A and 243A are disposed to face the coils 234A and 244A. Thereby, the coils 234A and 244A are supported by the support member 21A to be freely movable.

Next, described will be the structure of yokes that constitutes magnetic circuits between the coils 234A and 244A and the magnets 233A and 243A, which is employed in the drive mechanisms according to this embodiment for applying the maximum forces to the coils 234A and 244A. In this example, the yokes are formed to have a divided structure for the purpose of easy assembly. Since both of the two drive mechanisms have the same structure, only the structure of one of the yokes will be described.

Figure 5:
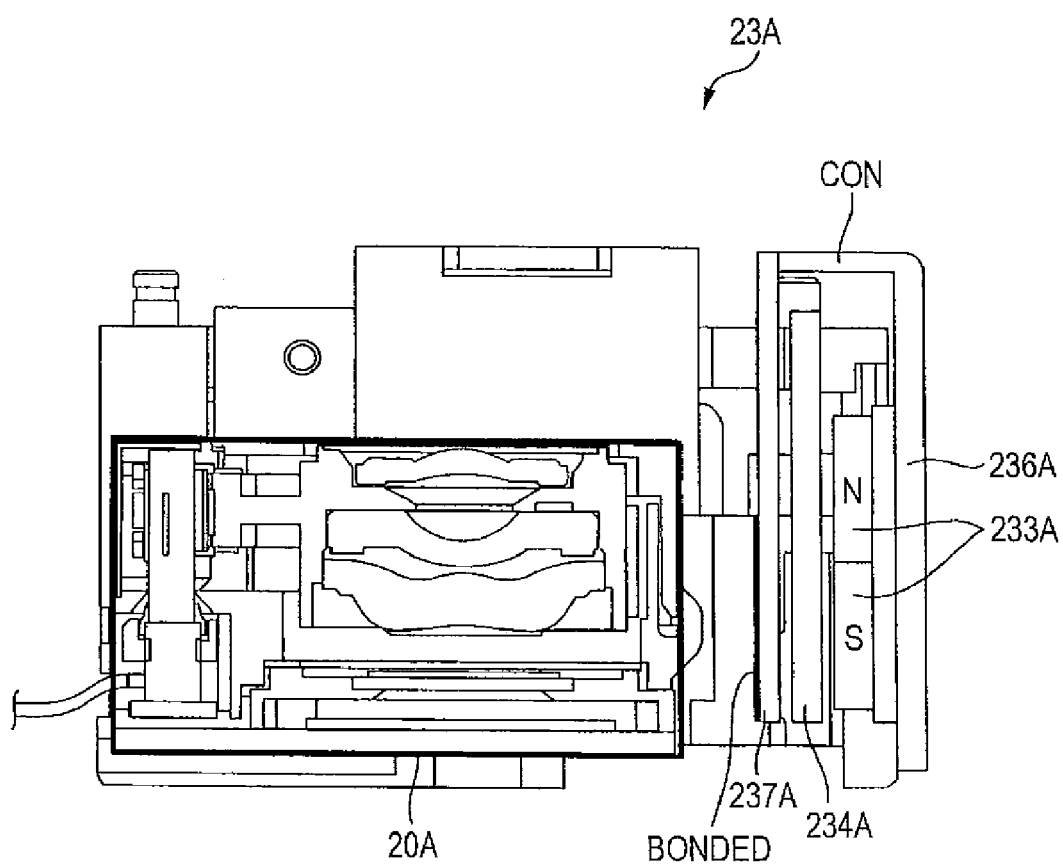
FIG. 5 is a diagram for explaining support structure of coils 234A and 244A.

FIG. 5 is a diagram for explaining the structure of the yoke.

As shown in FIG. 5, in this embodiment, one pair of yokes 236A and 237A which form a letter "U" shape as a whole is provided in this embodiment. Since the one pair of yokes is small, no attachment portion is provided and thus, the one pair of yokes is bonded to the support member 21A with an adhesive material and is installed inside.

The one pair of yokes 236A and 237A has: one pair of parallel plates which expand parallel with the magnet 233A and the coil 234A interposed therebetween; and a connection plate CON that connects two sides corresponding to the one pair of parallel plates together. The one pair of yokes 236A and 237A is constituted by a member that houses the magnet 233A and the coil 234A and that has an almost letter "U" shaped in section as a whole. In this example, the one pair of yokes 236A and 237A are divided into two pieces so as to have shapes that engage with each other in the vicinity of the connecting plate CON.

In this manner, since the one pair of yokes 236A and 237A having the divided shapes is employed, the drive mechanism can be easily assembled by installing one 237A of the yokes 236A and 237A of the one pair with an adhesive material in advance, installing the magnet 233A and the coil 234A, and then installing the other yoke 236A to be fitted to the one yoke 237A.

With the configuration shown in FIG. 5, after the drive mechanism is assembled, even if a magnetic force generated by a magnetic field formed by both the magnet 233A and the coil 234A exceeds the adhesive strength between the yoke 237A and the support member 21A, the one pair of parallel plates are supported by the connection plate CON and therefore, there is no case that the yoke is tilted.

Turning back to FIG. 4, components of the drive mechanism other than the yokes 236A and 237A will be described.

When the coils 234A and 244A are to be supported by the support member 21A so as to be freely movable, there is no way that the coils 234A and 244A are directly supported by the support member 21A. Thus, the two arms 231A and 241A are provided in the first and second wing portions 211A and 212A to hold the coils 234A and 244A as described above. The arms 231A and 241A are supported so as to be freely movable in the optical axis direction.

Also, in order to support the two arms 231A and 241A so as to be freely movable in the optical axis direction, a guide member EN0 extending in the optical axis direction of the lens 10 is provided in the vicinity of the support portion 210A of the support member 21A, and guide members EN1 and EN2 extending in the optical axis direction of the lens 10 are provided in end portions of the first and second wing portions 211A and 212A. Of the three guide members, EN1 and EN2, the guide member EN0 provided in the vicinity of the support portion 210A supports the two arms 231A and 241A commonly while the remaining two guide members EN1 and EN2 support the respective end portions of the two arms 231A and 241A. Thereby, the arms 231A and 241A are supported so as to be freely movable in the optical axis direction together with the coils 234A and 244A held by the arms 231A and 241A.

Accordingly, the two drive mechanisms 23A and 24A can swing the hold module 20 by moving the hold module 20 along the guide member EN1 through the first drive point D1 in the optical axis direction and by moving the hold module 20 along the guide member EN2 through the second drive point D2 in the optical axis direction.

Also, when the drive mechanisms 23 and 24 are configured as in this embodiment, the first and second drive sections 23 and 24 are collectively supported by the wing portions 211A and 212A of the support member 21A. Thereby, a compact shape is formed as a whole.

Next, with reference to an exploded view, structures of respective members constituting the image stabilization unit 2A shown in FIG. 6 will be described in detail.

Figure 6:
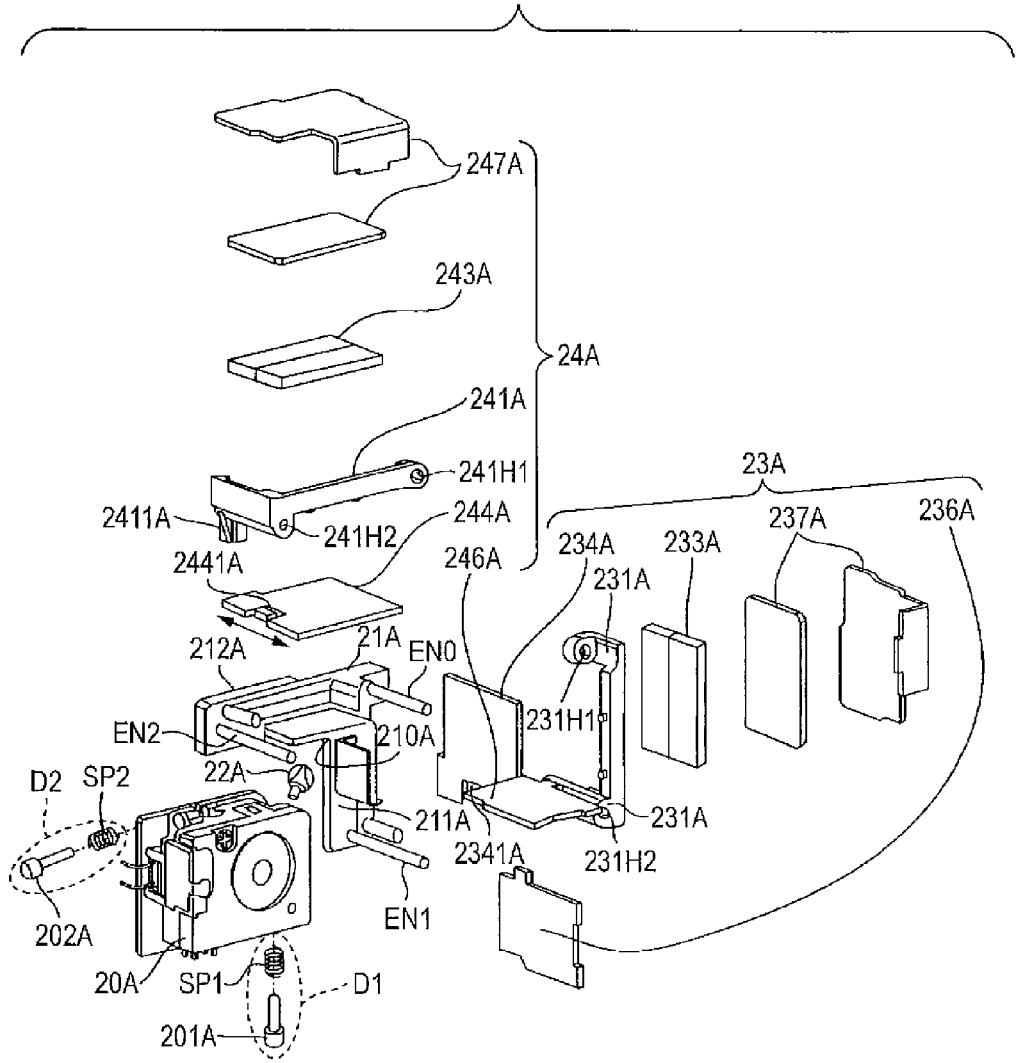
FIG. 6 is an exploded view of the image stabilization unit shown in FIG. 4.

FIG. 6 is the exploded view of the image stabilization unit shown in FIG. 4.

Figure 11:
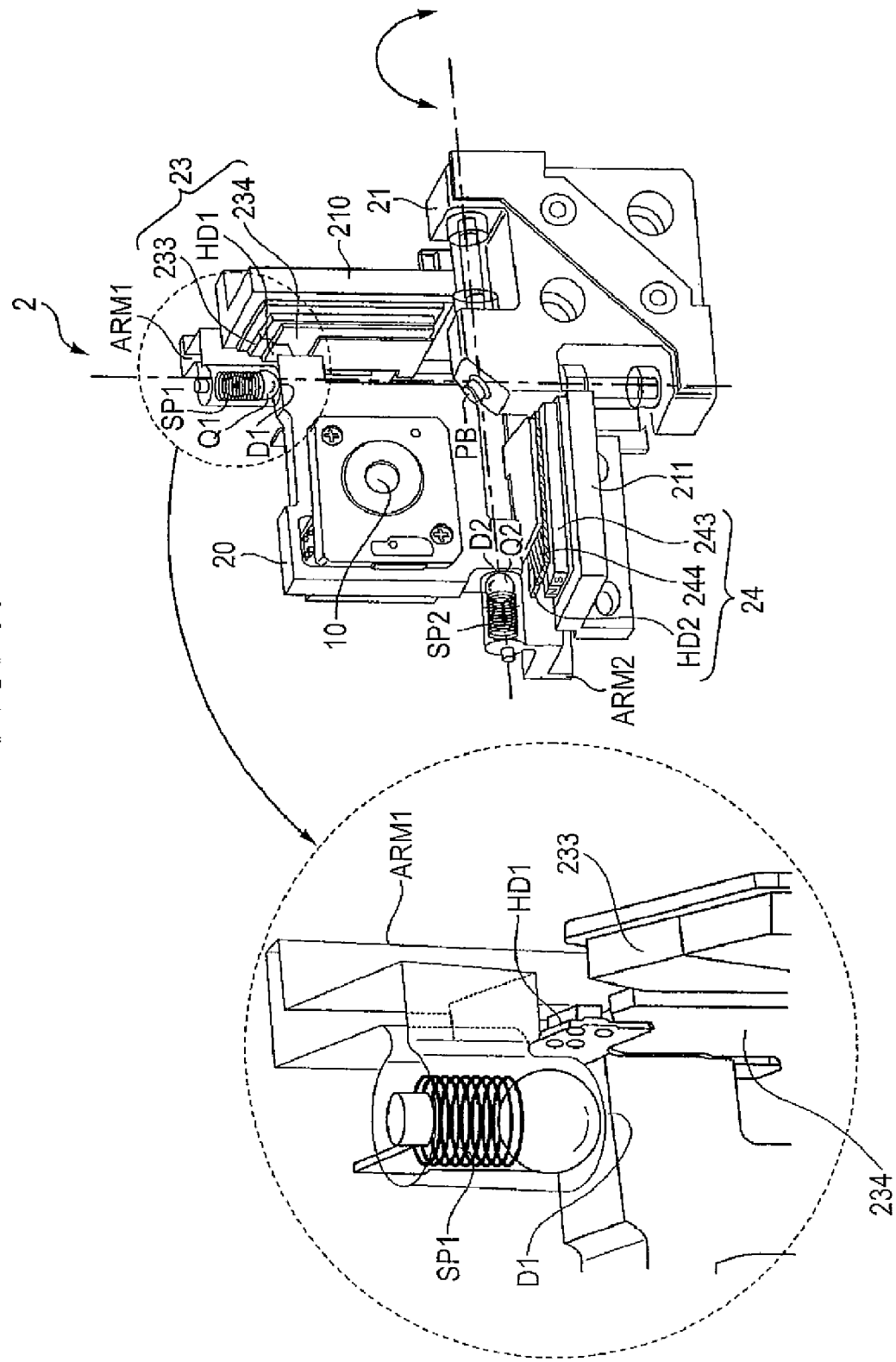
FIG. 11 is a diagram showing an image stabilization unit 2 of another example that is designed to be downsized in order to build it in a mobile device.

In the image stabilization unit having the structure shown in FIG. 11, end portions of the arms ARM1 and ARM2 are configured to be free ends, and thereby there is a problem that the outputs of the sensors for detecting the positions of the coil substrates are unstable. However, in this embodiment, the two guide members EN1 and EN2 are provided along the optical axis direction, the arms 231A and 241A are engaged with the guide members EN1 and EN2, and movement of the arms 231A and 2341A is regulated to be in the optical axis direction. Thereby, distances between the sensors 2341A and 2441A and the magnets 233A and 243A can be maintained to be constant in this embodiment. As a result, the outputs of the sensors can be stabilized.

The structure of the image stabilization unit will be described with reference to FIG. 6.

The hold module 20A having the lens 10 and the image sensor is shown on the lower left side of FIG. 6. In the pivot point 22A that is on the outer circumference of the hold module 20A, the sphere-shaped convex portion is formed. Also, the sphere-shaped convex portions 201A and 202A are formed in the first and second drive points D1 and D2, which are located on the outer circumference of the hold module 20A and which are apart from the pivot point 22A in the first and second directions different from each other. In FIG. 6, in order to facilitate understanding of the shapes of the constituent members, the convex portions 201A and 202A are shown to be apart from the hold module 20A. However, all of the convex portions 201A and 202A are installed into the hold module 20A as shown in FIG. 4. Shafts having the convex portions 201A, 202A on the front end portions are inserted into hollow center portions of the compression springs SP1 and SP2 and are installed into the hold module 20A so that portions constituting the first and second drive points D1 and D2 can freely receive driving forces from the first and second drive mechanisms 23A, 24A to swing the hold module 20A while receiving swing of the hold module 20A.

The support member 21A supporting the hold module 20A has the support portion 210A and extends in the first and second directions with the support portion 210A located in the center. Also, the support member 21A has the first and second wing portions 211A and 212A for holding the first and second drive mechanisms 23A and 24A. In the support portion 210A, the concave surface for receiving the convex portion, which is the pivot point 22A of the hold module 20A, is formed. When the convex portion 22A of the hold module 20A is engaged with the concave surface of the support member 21A, when holes 231H1 and 241H1 formed on one end portions of the two arms 231A and 241A provided in the first and second drive mechanisms 23A and 24A are commonly inserted into the guide member EN0, and when holes 231H2 and 241H2 formed on the other end portions of the two arms 231A and 241A are inserted into the guide members EN1 and EN2, the hold module 20 is supported so as to be freely swingable with respect to the support member 21A as shown in FIG. 4. The concave portions 2311A and 2411A connected to the convex portions 201A and 202A of the drive points D1 and D2 of the hold module 20A are formed in the opposite end portions of the two arms 231A and 241A, in addition to the holes 231H2 and 241H2 into which the guide members EN1 and EN2 are inserted. Therefore, when the drive points D1 and D2 are configured by engaging the convex portions 201A and 202A of the hold module 20A with the concave portions 2311A and 2411A and when the hold module 20 is driven through the drive points D1 and D2 in the optical axis direction, the hold module 20 can swing about the pivot point 22A.

In other words, when the coils 234A and 244A are held by the two arms 231A and 241A, respectively, when the concave portions 2311A and 2411A of the two arms 231A and 241A are connected to the convex portions 201A and 202A provided in the hold module 20A, respectively and when the two arms 231A and 241A are moved in the optical axis direction by flowing currents through the coils 234A and 244A, the hold module 20A swings about the pivot point 22A.

Also, when the arm 231A is being moved together with the coil substrate 234A in the optical axis direction by interaction between (i) the magnetic field formed by flowing current through the coil substrate 234A provided in the image stabilization unit 2A and (ii) the magnetic field formed by the magnet 233A, if a position of the coil substrate 234A is not known, the CPU 300 shown in FIG. 3 cannot control the image stabilization process smoothly by using the image stabilization unit 2A even with the image stabilization unit 2A being installed in the digital camera shown in FIGS. 1 and 2. Accordingly, hall elements 2341A and 2441A for position detection are provided in the coil substrates 234A and 244A so that the posture of the hold module 20A can be precisely controlled. The hall elements 2341A and 2441A shown in FIG. 6 are moved together with the coils 234A and 244A and detect changes in the magnetic forces applied by the magnets 233A and 243A when the arms 231A and 241A are being caused to drive the hold module 20A. The hall elements 2341A and 2441A detect changes in the magnetic forces applied from the magnets 243A and 244A expanding horizontally with respect to the optical axis direction when the arms 231A and 241A are being moved along the guide members EN1 and EN2 in the optical axis direction.

As describe above, in the configuration of FIG. 11, the end portions of the arms ARM1 and ARM2 are free ends. Therefore, there is the case where the outputs of the sensors may be unstable due to changes in the distances between the magnets 233 and 243 and the hall elements HD1 and HD2 serving as the sensors. However, when the guide members EN1 and EN2 limit movement of the arms 231A and 241A to the optical axis direction, the distances between the hall elements 2341A and 2441A and the magnets 233A and 243A are maintained to be constant. Accordingly, the hall elements 2341A and 2441A are moved only in a direction (a direction indicated by an arrow in the figure) parallel to the optical axis direction. Thereby, signals transmitted from the sensors are output stably.

By the way, in the image stabilization unit 2A shown in FIG. 4, it may be prevented that the hold module 20A is detached from the support member 21A due to disengagement between the convex and concave portions of the drive points D1 and D2 when the digital camera shown in FIGS. 1 and 2 is dropped. Otherwise, the image stabilization unit does not work and as a result, the image stabilization operation cannot be performed.

Also, stress may be applied to a flexible substrate 200A due to swing of the hold module 20A, depending on a method of drawing out the flexible substrate 200A from a sensor substrate 1201A provided in the hold module 20A. Therefore, it may be prevented that the flexible substrate 200A is detached from the sensor substrate 1201A due to the applied stress. Otherwise, even if an electric signal is supplied to the image stabilization unit from the control section, the electric signal is not transmitted to the image stabilization unit. As a result, the image stabilization unit becomes in a state where the image stabilization unit is inoperative.

Therefore, in the image stabilization unit 2A shown in FIG. 4, the method of drawing out the flexible substrate 200A is devised and such a structure is adopted that movement regulating members 202A and 203A are added so that the hold module 20A is not dropped from the support member 21A.

Figure 8:
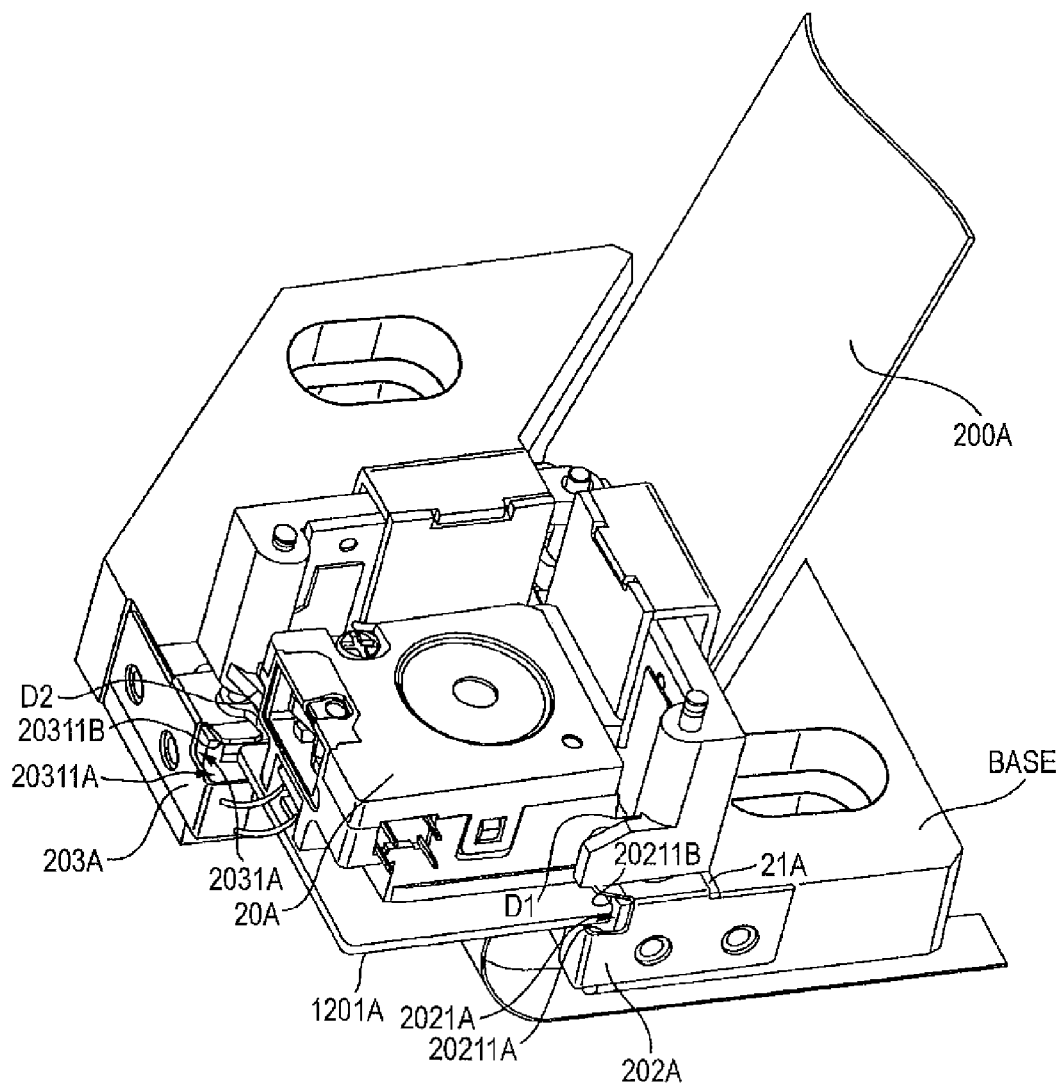
FIG. 8 is a perspective view of a state where the support member 21A of the image stabilization unit 2A shown in FIG. 7 is fixed to a support portion BASE in a mobile device, when they are viewed from an obliquely upward direction.

FIG. 7 is a diagram for explaining the method of drawing out the flexible substrate 200A from the hold module 20A. FIG. 8 is a perspective view showing a state where the support member 21A provided in the image stabilization unit 2A shown in FIG. 7 is fixed to a support portion BASE of a mobile device, when viewed from an obliquely upward direction.

FIG. 7(a) is a diagram of the image stabilization unit 2A when viewed from a front upward direction. FIG. 7(b) is a diagram of the image stabilization unit 2A when viewed from a side direction. FIG. 7(c) shows a state prior to installment of the hold module 20A into the support member 21A.

First, what devise is used in drawing out the flexible substrate 200A will now be described.

When the sphere-shaped convex portion formed in the pivot point 22A of the hold module 20A shown in FIG. 7(c) is brought into contact and engaged with the concave surface formed on the support portion 210A of the support member 21A, the state shown in FIG. 7(a) is achieved.

In the hold module 20A shown in FIG. 7(a), as described above, the sensor substrate 1201A is provided, and the flexible substrate 200A is drawn out from the sensor substrate 1201A. FIG. 7(b) shows the state prior to connection of the flexible substrate 200A to a connection portion of the sensor substrate 1201A disposed on the rear side of the hold module 20A.

As shown in FIG. 7(c), one end of the flexible substrate 200A is connected to the sensor substrate 1201A, and at least a portion of the flexible substrate 200A initially extending from the sensor substrate 1201A extends from the hold module 20A toward the outside thereof in a direction that is inclined with respect to both the first and second directions.

Here, the first and second drive points D1 and D2 are formed in such positions that the second axis connecting the first drive point D1 and the pivot point 22A together and the first axis connecting the second drive point D2 and the pivot point 22A together intersect each other at the angle of about 90 degrees. The portion of the flexible substrate 200A initially extending from the sensor substrate 1201A extends from the hold module 20A toward the outside thereof in a direction having an angle of about 45 degrees with respect to both the first and second directions.

Accordingly, the flexible substrate 200A can be drawn out in an inclined manner from the vicinity of the pivot point 22A, which involves the minimum swing. Thus, the stress applied to the flexible substrate 200A is reduced when the hold module 20A swings. As a result, disconnection between the flexible substrate 200A and the sensor substrate 1201A rarely occurs. In addition, the disconnection between the flexible substrate 1201A and the control section on the mobile device side to which the image stabilization unit is installed does not easily occur.

When the image stabilization unit 2A shown in FIG. 7(a) is installed into the inside of the digital camera shown in FIGS. 1 and 2, and the support member 21A is fixed to the support portion BASE inside the mobile device such as a digital camera as shown in FIG. 8, movement regulating portions 202A and 203A having notches 2021A and 2031A shown in FIG. 8 are fastened to the side surfaces of the support member 21A and the support portion BASE by using screws so that the image stabilization unit 2A is not detached from the support member 21A and the support portion BASE due to drop of the digital camera.

In this example, as shown in FIG. 8, the notches 2021A and 2031A of the movement regulating portions 202A and 203A regulate the movement range of the hold module 20A in the optical axis direction to a range in which engagement between the convex portions of the first and second drive points D1 and D2 and the concave portions receiving the convex portions is maintained.

For example, when the hold module 20A is to be dropped toward the lower side of FIG. 8, movement of the hold module 20A is regulated by lower sides 20211A and 20311A of the notch portions 2021A and 2031A of the movement regulating members 202A and 203A. Thereby, it is prevented that the hold module 20 is detached from the support member 21A and the support portion BASE. On the other hand, when the support module is to be dropped toward the upper side of FIG. 8, movement of the hold module 20A is regulated by upper sides 20211B and 20311B of the notch portions 2021A and 2031A of the movement regulating members 202A and 203A. Thereby, it is prevented that the hold module 20 is detached from the support member 21A and the support portion BASE.

In other words, even if the digital camera shown in FIGS. 1 and 2 having the image stabilization unit 2A shown in FIG. 8 is dropped, the engagement between the convex and concave portions in the drive points D1 and D2 is maintained by the notch portions 2021A and 2031A of the movement regulating members 202A and 203A. Thus, it is prevented that the hold module 20A is detached from the support member 21A and the support portion BASE. Accordingly, the dropped digital camera is taken, and a photographing operation can be immediately performed by using the digital camera while the image stabilization operation is performed.

Finally, a rotation operation of the image stabilization unit in the yaw and pitch directions will now be described.

FIG. 9 is a diagram for explaining the operation of the image stabilization unit.

Figure 9A:
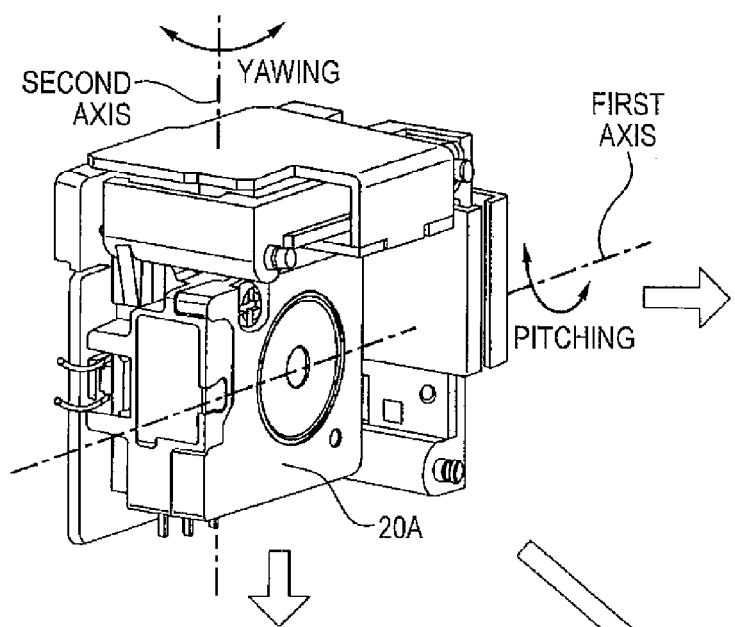
FIGS. 9A, B, C and D are diagrams for explaining an operation of the image stabilization unit 2A.
Figure 9C:
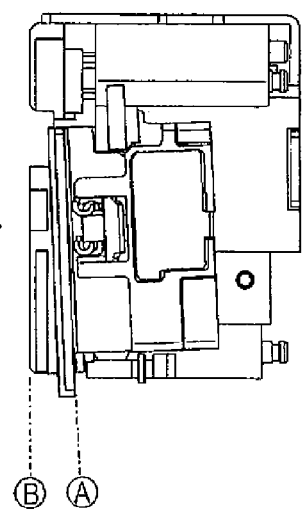
Figure 9B:
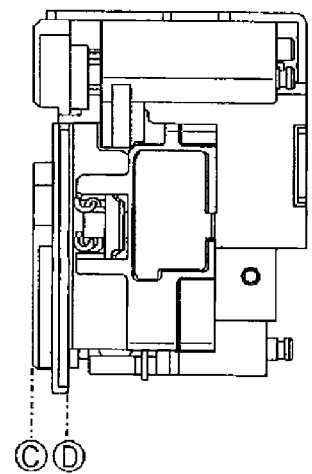
Figure 9D:
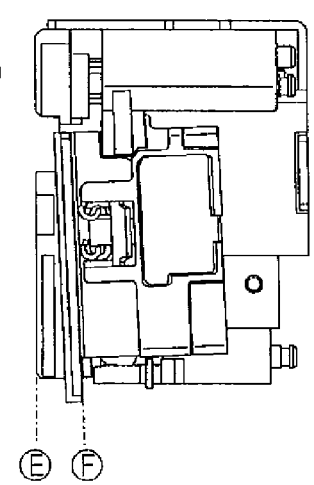

FIG. 9(a) is a perspective view of the image stabilization unit, when viewed from a front side in an obliquely upward direction. FIG. 9(b) is a diagram of the hold module 20A driven by the second drive mechanism 24A in the yaw direction, when viewed from the left side of the perspective view shown in FIG. 9(a). FIG. 9(c) is a diagram of the hold module 20A driven by the first drive mechanism 23A in the pitch direction, when viewed from the left side of the perspective view shown in FIG. 9(a). FIG. 9(d) is a diagram of the hold module 20A driven by both the first and second drive mechanism 23A and 24A in the yaw and pitch directions, when viewed from the left side of the perspective view shown in FIG. 9(a).

As shown in FIG. 9(a), the hold module 20A is supported so as to freely swingable, by the first and second drive mechanisms 23A and 24A which are supported by the support member 21A.

For example, when both the first and second drive mechanisms 23A and 24A do not drive the hold module 20A, a side B of the support member 21A supporting the hold module 20A and a side A of the sensor substrate 1201A are almost parallel to each other.

Here, when the hold module 20A is driven by the first drive mechanism 23A, the hold module 20A is rotated in the pitch direction to be tilted as shown in FIG. 9(c). When this state is viewed from the left side of FIG. 9(a), a tilt between the side A of the hold module 20A and the side B of the support member 21A is formed.

On the other hand, when the hold module 20A is driven by the second drive mechanism 24A, the hold module 20A is rotated in the yaw direction to be tilted. When this state is viewed from the left side of FIG. 9(a), a gap between a side D of the hold module 20A and a side C of the support member 21A is widened with maintaining the sides C and D to be parallel to each other as shown in FIG. 9(b).

On the other hand, when the hold module 20A is driven by both the drive mechanisms 23A and 24A, the hold module 20A is rotated around the first axis and the second axis to be tilted with respect to both the first and second axes shown in FIG. 9(a), as shown in FIG. 9(d). In FIG. 9(d), the state cannot be shown precisely. Thus, the same state as a state that the hold module 20A is tilted in the pitch direction is shown by showing that a tilt between the side E of the hold member and the side F of the hold module is formed.

In other words, according to the above-described image stabilization unit 20A, the hold module 20A can take an arbitral posture by driving the hold module 20A using the first and second drive mechanisms 23A and 24B.

When this image stabilization unit is disposed, for example, in an imaging apparatus, the hold module is driven so as to cancel any hand vibration, and the hand vibration is corrected. Thereby, it is possible to acquire a clear image without blur.

Finally, an example in which the image stabilization unit according to this embodiment is applied to a camera built-in cellular phone will now be described.

FIG. 10 is a diagram showing the configuration of a camera built-in cellular phone 200 to which the above-described image stabilization unit 2A is applied, as an example.

Figure 10A:
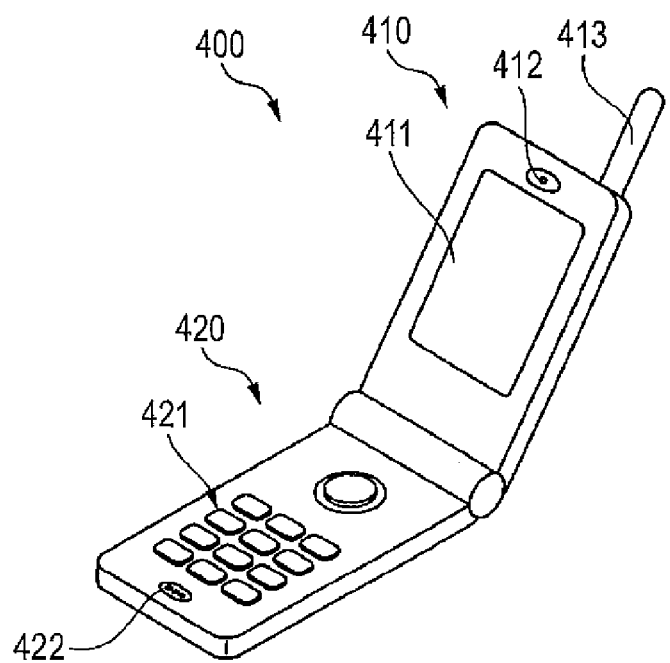
FIGS. 10A and B are diagrams for showing the configuration of a camera built-in cellular phone to the image stabilization unit 2A is applied.
Figure 10B:
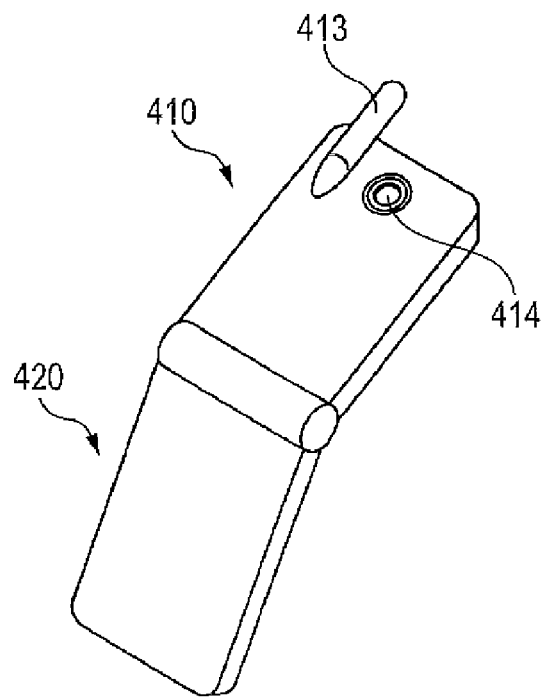

FIG. 10(a) is a perspective view showing the front side of the cellular phone 400. FIG. 10(b) is a perspective view showing the rear side of the cellular phone 400.

The configuration of the cellular phone will be described briefly with reference to FIG. 10.

The cellular phone 400 shown in FIGS. 10(a) and 10(b) has an upper part 410 and a lower part 420 and is configured as a flip type.

The upper part 410 of this cellular phone 400 includes a display screen 411, a mouth piece 412, an antenna 413, and a camera imaging lens 414 (FIG. 10(b)) disposed on the rear side. The lower part 420 includes operation keys 421 and an ear piece 422.

In a position where the camera imaging lens 414, shown in FIG. 10(b), is disposed, the image stabilization unit 2A described with reference to FIGS. 1 to 9 is installed. The image stabilization unit according to the embodiment of the invention can be applied to a mobile device having such a downsized thin-type structure.

As described above, the image stabilization unit in which the stress applied to the flexible substrate that is connected to the sensor substrate and drawn out externally is reduced, the image stabilization device having the image stabilization unit, and the imaging apparatus having the image stabilization device are implemented.

In the above-described embodiments, the case where the image stabilization device is applied to the imaging apparatus has been described. However, it is apparent that this device may be built in another optical device having an optical system such as a projection device, a copier, or the like. Furthermore, the elastic member is not limited to the above-described spring. Another different elastic member that is formed of an elastic material may be used.

What is claimed is:

1. An image stabilization unit comprising:
   a hold module that holds a lens;
   a support member including a support portion that supports the hold module so as to freely swing in any direction at a pivot point that is one point on an outer circumference of the hold module;
   a first drive mechanism that drives a first drive point located on the outer circumference of the hold module in an optical axis direction, wherein the first drive point is apart from the pivot point in a first direction that is different from the optical axis direction;

a second drive mechanism that drives a second drive point located on the outer circumference of the hold module in the optical axis direction, wherein the second drive point is apart from the pivot point in a second direction that is different from the optical axis direction and the first direction;

a first sensor; and a second sensor, wherein the first drive mechanism comprises
- a first arm that supports the first drive point so as to be freely rotatable,
- a first coil held by the first arm, the first coil that generates a first drive force in the optical axis direction upon reception of an action of a first magnetic force and a first current flow, to cause the first arm to drive the first drive point in the optical axis direction,
- a first magnet held by the support member, the first magnet that applies the first magnetic force to the first coil and expands horizontally with respect to the optical axis, and
- a first guide member fixed to the support member, the first guide member that guides the first arm so that a first action point of the first arm that supplies the first drive force to the first drive point is moved in the optical axis direction, the second drive mechanism comprises
- a second arm that supports the second drive point so as to be freely rotatable,
- a second coil held by the second arm, the second coil that generates a second drive force in the optical axis direction upon reception of an action of a second magnetic force and a second current flow, to cause the second arm to drive the second drive point in the optical axis direction,
- a second magnet held by the support member, the second magnet that applies the second magnetic force to the second coil and expands horizontally with respect to the optical axis, and
- a second guide member fixed to the support member, the second guide member that guides the second arm so that a second action point of the second arm that supplies the second drive force to the second drive point is moved in the optical axis direction, the first arm supports the first sensor, the first sensor detects change in the first magnetic force applied by the first magnet, the change caused by movement of the first arm in the optical axis direction when the first arm drives the first drive point, the second arm supports the second sensor, and the second sensor detects change in the second magnetic force applied by the second magnet, the change caused by movement of the second arm in the optical axis direction when the second arm drives the second drive point.

2. The image stabilization unit according to claim 1, wherein the hold module holds the lens and an image sensor that captures light from a subject to generate an image signal.

3. The image stabilization unit according to claim 1, wherein the first and second drive points are formed in such positions that a line segment connecting the first drive point and the pivot point and a line segment connecting the second drive point and the pivot point intersect with each other at about 90 degrees.

4. The image stabilization unit according to claim 1, wherein
   the hold module comprises a sphere-shaped convex portion in the pivot point, and
   the support member comprises, in the support portion, a sphere-shaped concave surface that receives the convex portion.

5. The image stabilization unit according to claim 1, wherein
   the hold module comprises sphere-shaped convex portions in the first and second drive points, respectively,
   the first and second arms respectively comprise, in the first and second action points, sphere-shaped concave portions that receive the sphere-shaped convex portions in the first and second drive points, and
   the first and second arms supply the first and second drive forces to the convex portions through the concave portions, respectively.

6. The image stabilization unit according to claim 1, further comprising:
   a vibration detection section that detects vibration; and
   a vibration control section that controls the first and second drive mechanisms to rotate the hold module based on a detection result by the vibration detection section.

7. An imaging apparatus comprising:
   the image stabilization device according to claim 6, wherein the imaging apparatus captures a subject image to generate image data in which blur is reduced by an operation of the image stabilization device.

* * * * *